(12) United States Patent
Spengler et al.

(10) Patent No.: US 7,823,687 B2
(45) Date of Patent: Nov. 2, 2010

(54) ELECTRIC POWER STEERING SYSTEM WITH BELT DRIVE AND CONTACTLESS BELT TENSION

(75) Inventors: Matthias Spengler, Baumweiler (DE); Jens Keppler, Lichtenstein (DE); Jens Stolzenburg, Ilsfeld-Auenstein (DE)

(73) Assignee: ThyssenKrupp Presta SteerTec GmbH, Dusseldorf (DE)

( * ) Notice: Subject to any disclaimer, the term of this patent is extended or adjusted under 35 U.S.C. 154(b) by 0 days.

(21) Appl. No.: 12/523,941

(22) PCT Filed: Jan. 7, 2008

(86) PCT No.: PCT/EP2008/000049

§ 371 (c)(1),
(2), (4) Date: Jul. 21, 2009

(87) PCT Pub. No.: WO2008/089881

PCT Pub. Date: Jul. 31, 2008

(65) Prior Publication Data

US 2010/0059308 A1 Mar. 11, 2010

(30) Foreign Application Priority Data

Jan. 24, 2007 (DE) .................. 10 2007 004 520

(51) Int. Cl.
*B62D 5/00* (2006.01)
(52) U.S. Cl. .................. 180/444; 180/443; 474/133
(58) Field of Classification Search .................. 180/443, 180/444; 474/133
See application file for complete search history.

(56) References Cited

U.S. PATENT DOCUMENTS

| 5,997,423 | A | 12/1999 | Kwon | |
|---|---|---|---|---|
| 6,960,145 | B2 * | 11/2005 | Fraley et al. | 474/134 |
| 2004/0043854 | A1 * | 3/2004 | Fraley et al. | 474/134 |
| 2007/0095600 | A1 * | 5/2007 | Jo et al. | 180/444 |
| 2007/0155559 | A1 * | 7/2007 | Horst et al. | 474/134 |
| 2007/0155560 | A1 * | 7/2007 | Horst et al. | 474/134 |
| 2008/0035415 | A1 * | 2/2008 | Namgung | 180/444 |

FOREIGN PATENT DOCUMENTS

| DE | 100 52 275 A1 | 5/2002 |
|---|---|---|
| JP | 2003 220958 A | 8/2003 |

OTHER PUBLICATIONS

The International Preliminary Report on Patentability and Written Opinion issued in related International Application No. PCT/EP2008/000049 with the English language translation.

* cited by examiner

*Primary Examiner*—Lesley Morris
*Assistant Examiner*—Tashiana Adams
(74) *Attorney, Agent, or Firm*—Connolly Bove Lodge & Hutz LLP

(57) ABSTRACT

The invention relates to an electric power steering for a motor vehicle that may include a gear rack (11) that is positioned axially displaceable inside a steering housing (I) and is driven by an electric servomotor (16), arranged inside a motor housing (7), with the aid of a belt (14) that runs inside a surrounding housing part (6) and a gear (12) for assisting the steering, wherein the belt (14) is configured ferromagnetically and at least one magnet (20) is arranged inside the housing part (6), beside the belt (14) and at a distance to the belt (14).

6 Claims, 2 Drawing Sheets

ELECTRIC POWER STEERING SYSTEM WITH BELT DRIVE AND CONTACTLESS BELT TENSION

CROSS REFERENCE TO RELATED APPLICATIONS

Figure 1:
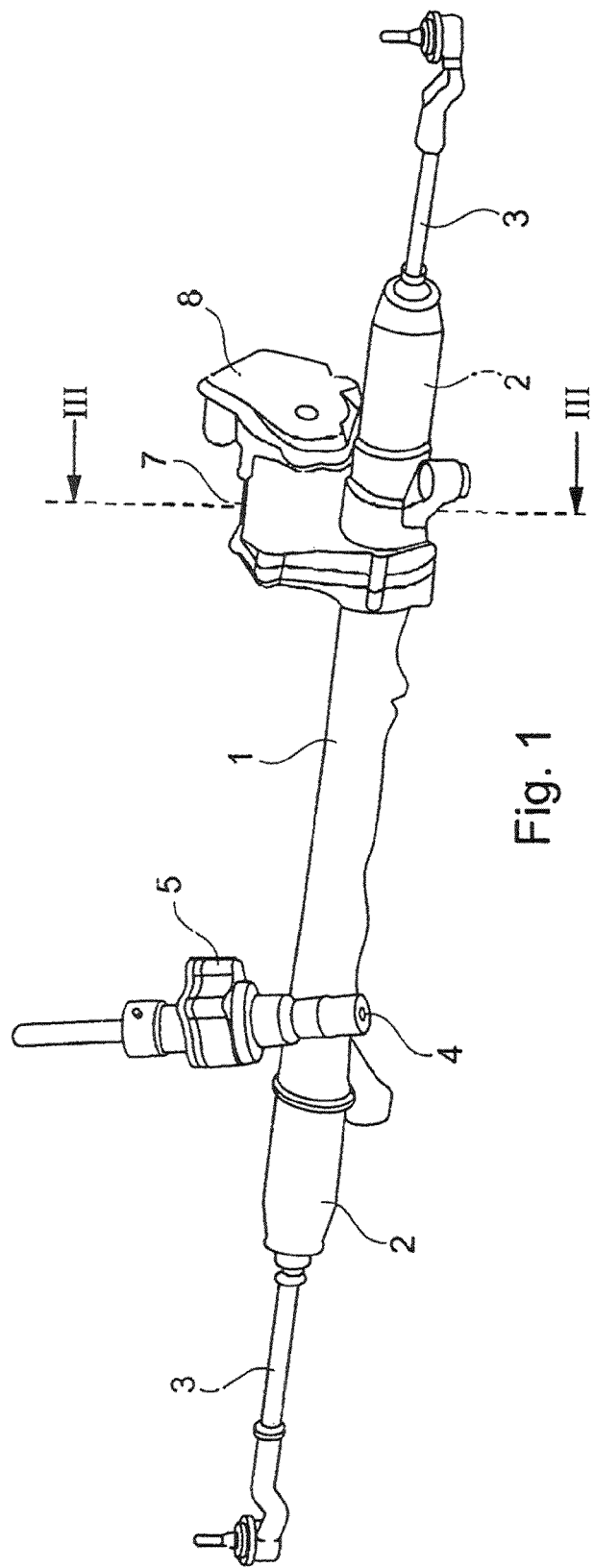

This application is a national phase of PCT/EP2008/000049, filed on Jan. 7, 2008, which claims priority to German Application No. 10 2007 004 520.6, filed Jan. 24, 2007, the entire contents of both of which are hereby incorporated by reference.

The present invention relates to an electric power steering.

A power steering of this type is known from the German reference DE 10052275 A1. With this power steering, an electric servomotor provides power for assisting the steering and this power is transferred via a belt pulley, a toothed belt and a reduction gear to the gear rack. Not least because of the desire for a low noise level, it is therefore necessary to keep the play of the belt drive as low as possible and, in particular, to ensure a constant belt tension in both movement directions of the drive.

With the known power steering, the pre-tensioning is achieved with a fixedly adjusted tensioning roller fitted against the back of the toothed belt.

Two other methods of adjusting the belt tension are known from different types of electro-mechanical power steering. On the one hand, the belt tension can be adjusted via an eccentric earn plate while, on the other hand, pulling devices are used for pulling the motor housing away from the power steering housing, thereby tensioning the belt. These solutions are involved and correspondingly expensive.

A further option for tensioning a rotating drive means in both running directions of the drive is known from the British Patent document GB 1,117, 863. With this type of device, a chain drive provided with a fixed and a movable shaft is tensioned in such a way that the displaceable bearing block is pushed with the aid of a spring-tensioned wedge away from the fixedly positioned shaft.

A belt tensioning device provided with an electromagnet is furthermore known from the Japanese Patent Application JP 09257109A, which proposes using a magnet to exert a tensioning force via an armature onto a tensioning roller. This type of tensioning device is not contactless.

Finally, the German Patent document DE 2138288 discloses providing a rotating belt with therein incorporated magnetic particles for crinkling thermo-plated threads and to use these magnets for deforming the belt during the operation.

It is therefore the object of the present invention to improve a power steering of the aforementioned type in such a way that a belt can be tensioned without using additional components that are fitted against the belt, e.g., a tensioning roller, thus preventing additional wear of the belt caused by the tensioning element and to furthermore avoid additional and expensive adjustment elements.

This object is solved with a power steering having the features as disclosed in claim 1.

With an electric power steering for a motor vehicle, provided with a gear rack that is axially displaceable inside a steering housing and can be driven by an electric servomotor, arranged inside a motor housing, with the aid of a belt and a gear for assisting the power steering, the belt is ferromagnetically configured and at least one magnet is arranged in the housing part surrounding the belt, at a distance from the belt. A tension can be generated in the belt as a result of the effect of the magnet on the belt, which is preferably a toothed belt.

The belt can advantageously consist of a steel cloth comprising magnetizable steel. However, the belt can also contain ferromagnetic steel fibers or iron particles.

It is furthermore advantageous for a uniform effect of the tensioning device in both running directions of the belt if a total of two magnets are arranged in the center between the points of contact of the belt with the belt pulleys, beside each exposed belt section.

A simple configuration is obtained if the at least one magnet is a permanent magnet.

Figure 2:
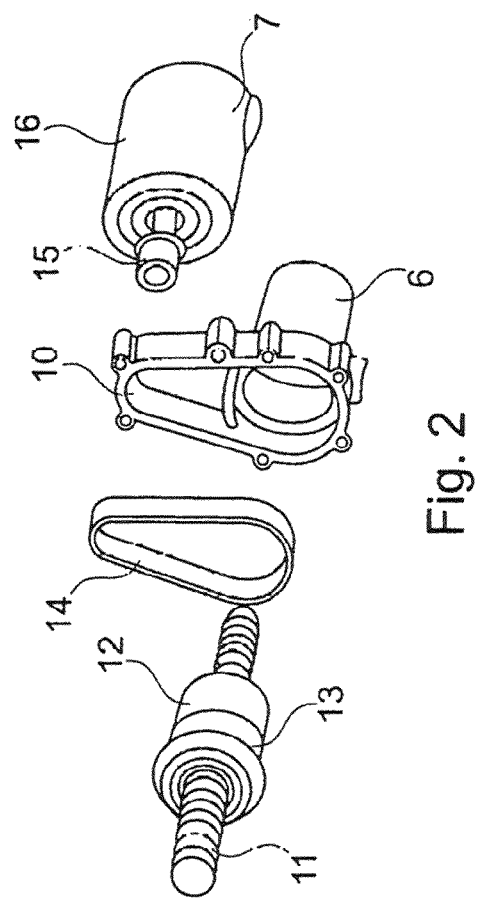
Figure 3:
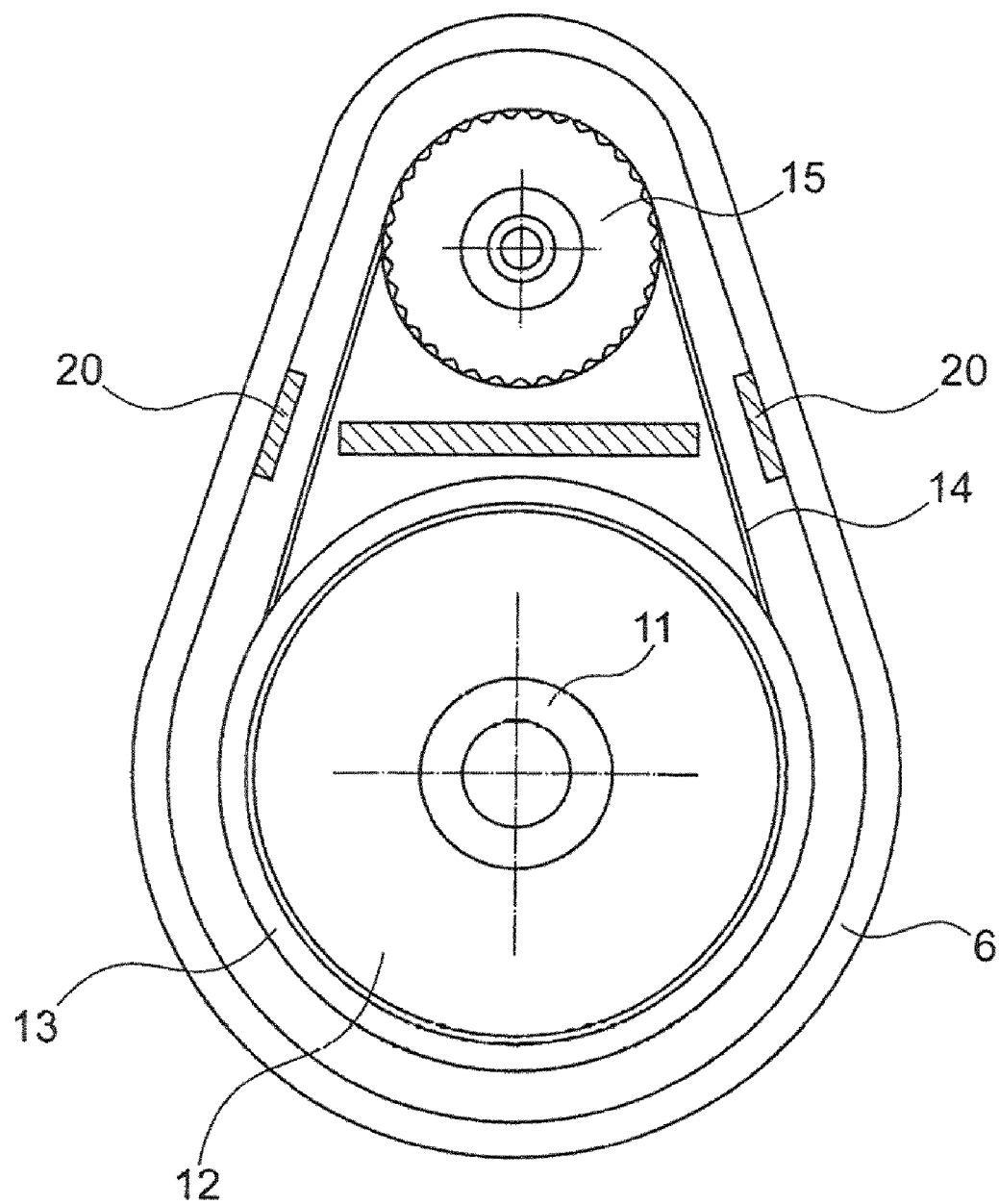

An exemplary embodiment of the present invention is described in the following with the aid of the drawings, showing in:

FIG. 1 An electric power steering with a servomotor that is arranged axis-parallel to the gear rack, shown in a perspective view;

FIG. 2 The servo drive for the power steering according to FIG. 1, shown in an exploded view; as well as FIG. 3 The power steering according to FIG. 1 and FIG. 2, shown in a radial section along the line III-III from FIG. 1.

FIG. 1 shows an electric power steering with a steering housing 1 that surrounds a gear rack arranged displaceable on the inside. The gear rack is provided on each end with one ball joint, which is enclosed by an expansion bellows 2. The ball joints in turn support respectively one tie rod 3. A pinion housing 4 surrounds the steering pinion, which engages in the gear rack. The steering pinion in turn is equipped for a connection to a steering column and a steering wheel. It furthermore carries a torque sensor for the steering control, which is arranged inside a sensor housing 5.

A reduction gear for driving the gear rack is arranged inside a detachable housing part 6, at the opposite end of the steering housing 1. The housing part 6 furthermore supports a motor housing 7, which is arranged at a distance and parallel to the steering housing 1. The motor housing 7 in turn supports an electronic control 8 for activating the servomotor arranged in the motor housing 7.

The servo drive component is shown in further detail in FIG. 2. The housing part 6 is provided on its visible, flat side with a flange 10 for attaching it to the non-visible steering housing 1. A gear rack 11 extends in longitudinal or axial direction through the housing part 6. The gear rack 11 is provided with a drive in the form of a ball screw 12, which engages with its balls and without play in a corresponding thread on the gear rack 11. The ball screw 12 is positioned so as to rotate inside the housing part 6. The ball screw 12 is provided along the circumference with a tooth-type notching 13 for a toothed belt 14. The toothed belt 14 in turn runs inside the housing part 6, from the ball screw 12 to a correspondingly embodied pinion 15 of the servomotor 16 that is arranged inside the motor housing 7.

The motor housing 7 is attached in a precisely predetermined position on the housing part 6.

The further joint operation of the components described so far is known from the prior art and need not be described again herein. The same is true for the control and operation of the power steering.

A magnet 20 is furthermore arranged inside the housing 6, beside the toothed belt, at a location approximately in the center beside the straight-line belt section of the toothed belt 14, between the tooth-type notching 13 and the pinion 15.

FIG. 3 shows a cross section through the power steering according to FIG. 1, approximately along the line III-III in FIG. 1, meaning in the region where the toothed belt 14 is located.

The housing part 6 surrounds the power steering drive which, starting with the pinion 15 of the servomotor 16, via a toothed belt, acts upon the tooth-type notching 13 of the ball screw 12 and thus upon the gear rack 11. A rotation of the pinion 15 causes an axial displacement of the gear rack 11. A total of two magnets 20 are arranged on the inside of the housing part 6, symmetrical to the axis of symmetry for the housing part 6 which connects the two center points of the gear rack 11 and the servomotor 16.

It is undesirable for the tension of the toothed belt 14 if the belt tension decreases during the operating period of the belt, thereby resulting in a play that represents a particular disadvantage for reversing the rotational direction of the servo drive since it would result in noise and over time in poorly defined states of the earlier adjustment. Vibrations can furthermore build up in the respectively non-stressed belt section. The toothed belt 14 is therefore ferromagnetically configured, for example by incorporating a steel cloth, steel fibers, or iron particles. In the effective range of the magnets 20, the toothed belt 14 is pulled toward the outside as a result of the magnetic pull and is tensioned in this way, thereby preventing the generating of vibrations.

The magnets 20 can be permanent magnets, but can also be electro-magnets. The air gap between the magnets 20 and the toothed belt 14 can amount to a few millimeters, for example 2-4 mm, since the toothed belt 14 is tensioned at the start of the operating period and the elongation to be expected during the operation is very small. It is ensured in this way that the magnetic pull on the toothed belt 14 is sufficiently high because of the small air gap.

REFERENCE NUMBER LIST 1. steering housing
2. expansion bellows
3. tie rod
4. steering pinion housing
5. sensor housing
6. housing part
7. motor housing
8. electronic control
10. flange
11. gear rack
12. ball screw
13. tooth-type notching
14. toothed belt
15. pinion
16. servomotor
20. magnet

The invention claimed is:

1. An electric power steering for a motor vehicle, comprising a gear rack that is positioned axially displaceably inside a steering housing and can be driven by an electric servomotor, positioned inside a motor housing, with the aid of a belt that moves inside a surrounding housing part and a gear for assisting the power steering, wherein the belt is configured ferromagnetically and wherein at least one magnet is arranged inside the housing part beside the belt and at a distance to the belt.

2. The power steering according to claim 1, wherein the belt is a toothed belt.

3. The power steering according to claim 1, wherein the belt comprises a steel cloth.

4. The power steering according to claim 1, wherein the belt contains iron particles.

5. The power steering according to claim 1, wherein a total of two magnets are arranged in the center between the points of contact between the belt and the belt pulleys, beside each exposed belt section of the belt.

6. The power steering according to claim 1, wherein the at least one magnet is a permanent magnet.

* * * * *